United States Patent Office 3,315,993  
Patented Apr. 25, 1967

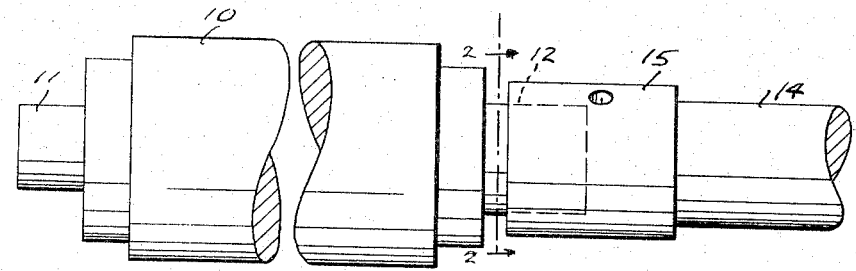
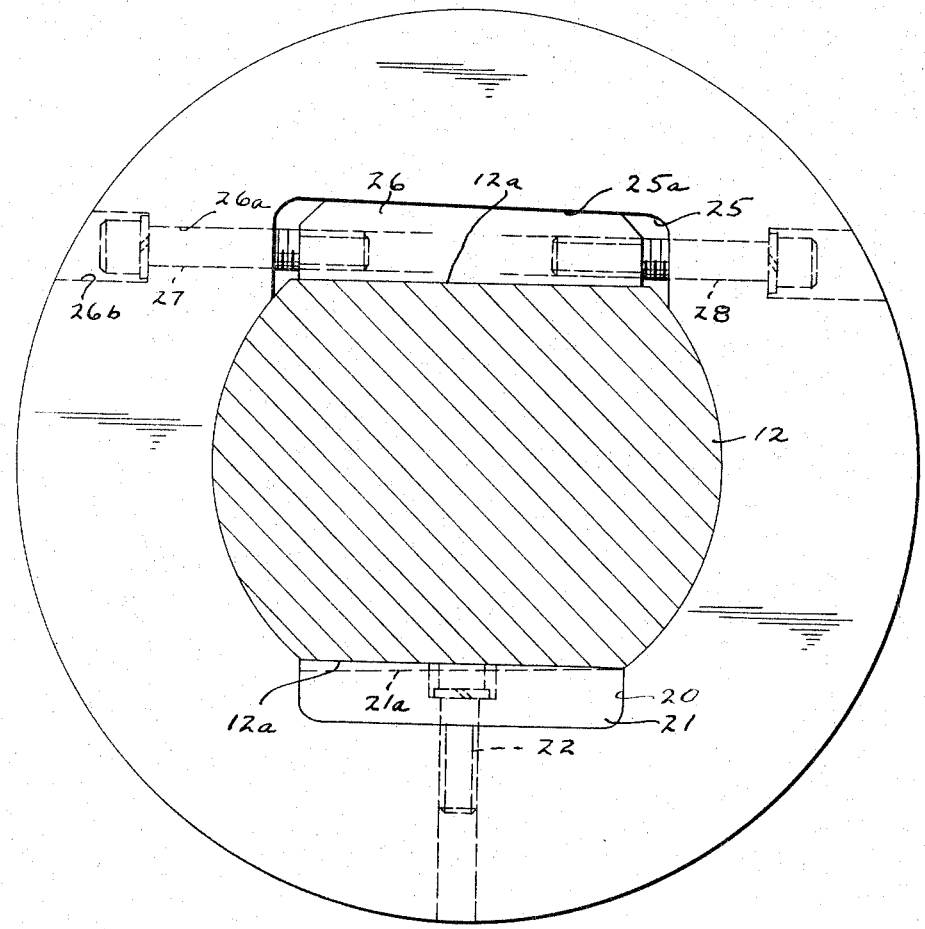

3,315,993  
ROLL NECK COUPLING  
Robert M. Church, Westfield, N.Y., assignor to Ajax Flexible Coupling Co. Inc., Westfield, N.Y., a corporation of New York  
Filed Oct. 9, 1964, Ser. No. 402,726  
3 Claims. (Cl. 287—52.05)

This invention relates to the means for connecting a power drive shaft to a driven shaft. It is particularly useful in connecting the power shaft to the stub shaft of a roll of the type used for rolling metal in a steel mill, although it is not limited in its use to steel mills.

It is well known, to those versed in the art, that a mill for the rolling of metal to reduce its thickness may comprise stands in which are pournalled one or more rolls. The rolls are usually driven and the metal is passed back and forth between the rolls which causes the metal to be reduced in thickness. Obviously the load on the roll shafts is very high. Usually a roll has a neck which projects through a support stand and a coupling is provided from a driven shaft to the neck of the roll. Because of the large power involved in driving such a mill, the couplings are very heavy and cumbersome to handle. The frequent disassembly of the roll neck to coupling joint is necessary, due to replacement of rolls because of marking of the working surfaces. Since the couplings are very heavy, they are difficult to handle, usually requiring the use of hoists and jacks.

One of the chief things to be desired is to construct such a coupling that the handling and assembly of the parts is facilitated. During use, it is particularly desirable that the back-lash be reduced to a minimum and this places a limit on the amount of assembly clearance.

Devices have been made which were of a self-tightening nature, such as is illustrated in Patent No. 2,883,838. Such a device is expensive to make, and, the actual clamping effect realized by the structure is not particularly desirable.

Also in common use is what is known as flatted bore housings. These, when once assembled, are the most desirable. There was a problem present during assembly, since the clearance was of a very low amount. For instance, with a roll neck having a 3″ distance across the flats, the clearance for assembly would normally be in the range of 0.008″. The problem, of course, being the ability to assemble the coupling with the neck with such a close clearance.

By the present invention it is possible to provide an improved formation for the bore of a coupling which will cooperate with the standard flattened roll necks and wherein the coupling is economical to manufacture, easy to install and the wear is materially reduced. At the same time the back-lash, as compared to the above patent, is completely eliminated. It has the added advantage that it may be used in places where the direction of revolution of the rolls is periodically reversed.

Still other advantages of the invention and the invention itself will become more apparent from the following description of an embodiment thereof which is illustrated by the accompanying drawings.

In the drawings:

FIG. 1 is a fragmentary side elevational view of a roll and a coupling of my invention; and FIG. 2 is a section on the line 2—2 of FIG. 1.

In the drawings, FIG. 1 illustrates a roll 10 having a bearing shaft 11 on one end and an enlarged stub and drive shaft or neck 12 on the other end.

A drive shaft 14, which is driven from a source of power not shown, is provided with a coupling 15 which surrounds and engages with the neck 12.

As stated, the roll neck 12 is provided with diametrically opposite flats 12a and these are ordinarily in engagement with corresponding flats on the inside of the bore of the coupling.

In the present invention, as best shown in FIG. 2, the roll neck 12 is of the standard configuration. The drive coupling, however, is provided with a pair of flat bottom recesses on opposite sides extending substantially parallel to the shaft. The lower recess 20, as viewed in the drawing is provided with a flat key 21 which seats in the recess and engages with the flat of the shaft. It is held in position by a stud 22 which is countersunk in the face of the key and is threaded into the coupling. At the other side the recess 25 is considerably wider and the wall 25a is inclined transversely to the shaft so that the recess is of greater depth on the left side than the right side. A wedge shaped key 26 is disposed between the top of the recess and the flat on the shaft.

Means is provided to move the key transversely to the shaft and to cause it to firmly wedge between the flat and the top of the recess. To this end the coupling is bored on a chord at 26a and a pair of cap screws 27 and 28, that have the heads disposed in the counterbores 26b, have their threaded ends threaded into the key 26 on opposite sides thereof. By adjusting the screws 27–28 the key may be moved from one side of the recess to the other.

When the flatted shaft is to be inserted, the screw 27 is turned into the key and the screw 28 outward. This causes the key to be moved to the left into the deeper part of the recess 25. This provides sufficient clearance that the roll shaft may be easily inserted. Once in place the screw on the right is tightened and the one on the left loosened to cause the key to move to the right. Sufficient clearance is provided around the screws that the wedge may move toward and from the shaft without the screw binding.

It is apparent that the wedge needs only the top face inclined. It is also contemplated, however, that both faces could be inclined and the flat on the shaft correspondingly inclined. However, in order to provide the above type of cooperation, the lower key 22 could have its shaft engaging face inclined, as shown by the dotted lines 21a, which inclination is exaggerated for the purpose of explanation, and since the flats 12a are ordinarily parallel to each other, this could cause the upper flat to be tilted and thus provide greater clearance space for assembly purpose.

It will be noted that with this structure the formation of the opening in the coupling lends itself to being made on conventional slotter equipment, such as is used for machining a conventional flatted bore. That with this construction additional clearance can be provided between the roll neck and the bore which permits easier installation. There are no moving parts which can fret or function improperly. In addition, the resistance to wear is increased greatly over the prior art devices.

Further in event of wear, the keys 21 and 26 may be easily replaced.

It is also apparent that the two screws 27–28 enable the key to be adjusted to any exact position desired and the degree of wedging clearly controlled to make the coupling engage with the roll neck with the desired degree of pressure. Since the clearance can be readily controlled, it facilitates the assembly.

Having thus described the invention in an embodiment thereof, I am aware that numerous and extensive departures may be made therefrom without departing from the spirit or scope of the invention as defined in the appended claims.

I claim:

1. In combination with a power drive shaft and a driven shaft, an annular coupling member for connecting said shafts, at least one of said shafts having a portion of generally cylindrical contour with a pair of antipodal flats on the side at the end, said coupling member formed with a recess for receiving said flattened shaft, said recess walls having semi-cylindrical parts for reception of the cylindrical parts of the shaft and first and second flattened parts disposed opposite the flattened parts of the shaft, wedge means disposed between the first flat of the recess and one flat of the shaft, said wedge means being tapered transversely to the axis of the shaft, opposed screw means extending through the wall of the coupling member and engaged in opposite ends of the wedge means to move the wedge means transversely in both directions to the axis of the shaft and coupling, and a fixed key disposed between the second flat of the recess and the other flat of the shaft, said fixed key having an inclined surface engaged with the flat on the shaft holding the shaft with the other flat surface inclined relative to the wedge means.

2. A device as described in claim 1, wherein the bottom of the recess for the wedge means is inclined.

3. A device as described in claim 1, wherein the wedge means has oppositely inclined surfaces.

References Cited by the Examiner

UNITED STATES PATENTS

| 53,143 | 3/1866 | Hawkins | 287—53 |
| 535,583 | 3/1895 | Hamilton | 287—133 |
| 577,701 | 2/1897 | Wilson | 287—52.08 X |
| 3,222,884 | 12/1965 | Lyle | 287—52.07 X |

FOREIGN PATENTS 912,619  4/1946  France.

CARL W. TOMLIN, *Primary Examiner.*

A. V. KUNDRAT, *Assistant Examiner.*